United States Patent [19]

Mayle

[11] 3,825,838

[45] July 23, 1974

[54] SEARCH TUNE DETECTOR CIRCUIT

[75] Inventor: Louis F. Mayle, Fort Wayne, Ind.

[73] Assignee: The Magnavox Company, Fort Wayne, Ind.

[22] Filed: Aug. 3, 1972

[21] Appl. No.: 277,550

[52] U.S. Cl. .......................... 325/470, 178/5.8 AF

[51] Int. Cl. .......................... H04b 1/34

[58] Field of Search .......... 178/5.8 R, 7.3 R, 7.3 D, 178/5.8 AF, 7.5 SR; 334/13, 16, 18, 20; 325/468, 469, 470

[56] References Cited

UNITED STATES PATENTS

| | | | |
|---|---|---|---|
| 2,609,492 | 9/1952 | Loughlin | 325/470 X |
| 2,898,400 | 8/1959 | Parmet et al. | 325/470 X |
| 3,131,370 | 4/1964 | Hahnel | 325/470 X |
| 3,389,216 | 6/1968 | Sennick | 178/5.8 R |
| 3,519,939 | 7/1970 | Tashima | 325/47 O X |
| 3,688,199 | 8/1972 | Saeki et al. | 325/469 |

*Primary Examiner*—Benedict V. Safourek
*Attorney, Agent, or Firm*—T. A. Briody; W. W. Holloway; R. T. Seeger

[57] ABSTRACT

An improved circuit for indicating the tuning of a heterodyne television receiver to an active station and for providing an output signal indicative thereof is disclosed. The circuit employs a tuned circuit resonant at an intermediate frequency of the receiver for sensing proper tuning but allows this resonant circuit to sense only during the concurrence of flyback and synchronizing signals. A Darlington pair senses resonance in the resonant circuit and provides a search tune stop signal when that resonance occurs. The Darlington pair also functions to cause inhibition of the receiver audio signal during search tuning and to prevent resonance in the tuned circuit at times other than during search tuning.

7 Claims, 3 Drawing Figures

SEARCH TUNE DETECTOR CIRCUIT

BACKGROUND OF THE INVENTION

The present invention relates to a search tune television receiver and more particularly to an improved and simplified circuit for obtaining a signal such as a step function for stopping a drive motor or other means for tuning over the television band. Search tuning schemes are, of course, not new, and the state of the art is well illustrated by applicant's prior art U.S. Pat. Nos. 3,388,215; 3,478,270 and 3,502,801. Search tuning systems such as represented by the foregoing patents generally stop a tuner drive motor on a television signal when a sync gate actuated by the horizontal synchronizing signal or a harmonic thereof and a video intermediate frequency gate actuated by the video intermediate frequency carrier are both closed. This approach has two disadvantages. The motor stopping signal is dependent upon the video content of the television signal being received since an all white picture will have a minimum of energy in the video intermediate frequency signal while an all black picture will have maximum energy in that signal. Also the tuned circuit in the motor stopping signal detector which is tuned to the video intermediate frequency carrier frequency (generally 45.75 megahertz) and coupled to the video intermediate frequency circuit has a tendency to deteriorate the video intermediate frequency response characteristics.

Accordingly it is one object of the present invention to provide a search tuning system which is independent of the video content of a received television signal.

It is another object of the present invention to provide a search tuning system which does not have a deleterious effect on the video intermediate frequency pass band characteristics of the receiver.

SUMMARY OF THE INVENTION

The foregoing as well as numerous other objects and advantages of the present invention are achieved by providing a tuned circuit which senses for the video intermediate frequency signal only during the concurrence of a synchronizing pulse and a horizontal flyback pulse. The circuit comprises a tuned circuit tuned to the video intermediate frequency and coupled to the intermediate frequency system by loose mutual inductance between the coil of the tuned circuit and an intermediate frequency coil in the receiver. This tuned circuit is normally detuned by an additional reactance by way of a forwardly biased diode, which diode is reverse biased in the presence of a synchronizing pulse to thereby allow the resonant circuit to resonate. As a further feature, a transistor which is responsive to resonance in the tuned circuit performs several functions heretofore requiring separate transistors. It mutes the receiver audio during the search tuning operation. It provides a search tune motor stopping pulse. It deactivates the tuned circuit when that circuit is not performing its searching function. It also provides for the stopping of a VHF search operation on the UHF position.

Accordingly it is a further object of the present invention to prevent a search tuning system from accidentally stopping on the sound intermediate frequency carrier rather than the video intermediate frequency carrier.

A still further object of the present invention is to provide a search tuning system which stops more accurately.

Yet another object of the present invention is to provide a search tuning system which is independent of synchronizing pulse width variations.

Still another object of the present invention is to provide a search tuning system which is economical to construct and employs a reduced number of components.

A still further object of the present invention is to provide a search tuning detector which is relatively insensitive to variations in synchronizing pulse width, flyback pulse amplitude and horizontal hold control setting.

BRIEF DESCRIPTION OF THE DRAWING

The aforementioned and other objects, features and advantages of the present invention will become more apparent from the following detailed description thereof when considered in conjunction with the drawings wherein.

DESCRIPTION OF THE PREFERRED EMBODIMENT

Figure 1:
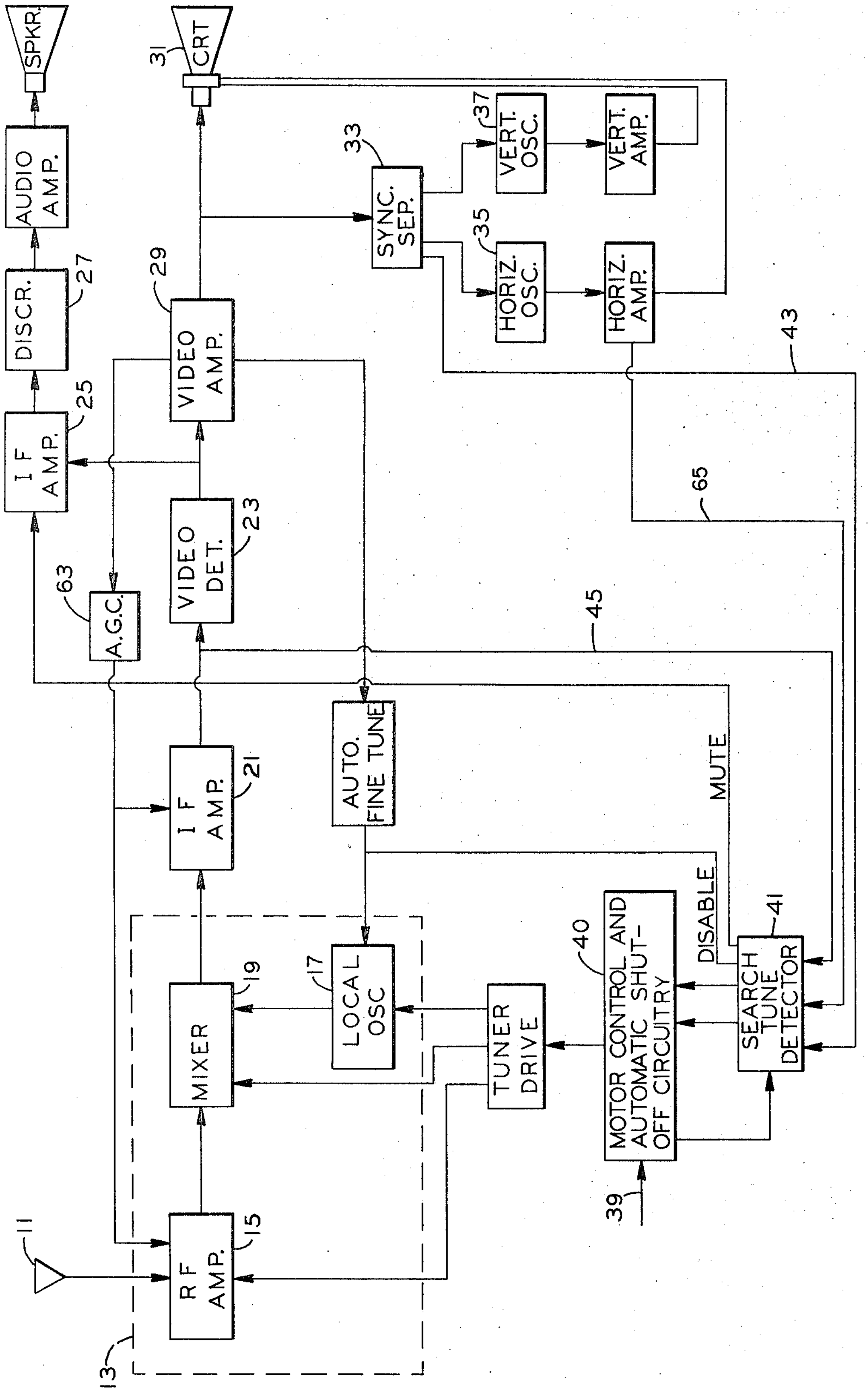
FIG. 1 is a block diagram of a television receiver employing the principles of the present invention.

Turning first to the somewhat generalized block diagram of a heterodyne type television receiver as illustrated in FIG. 1, incoming signals from an antenna 11 are tuned by a tuner indicated generally by 13 and which, of course, will normally comprise a VHF tuner and a UHF tuner. Each of the tuners will typically comprise a radio frequency amplifier 15, a local oscillator 17 and a mixer 19 for combining the amplified radio frequency signals and a locally generated signal to provide as the mixer output an intermediate frequency signal to an intermediate frequency amplifier 21. After detection by a video detector 23 the audio portion of the detected signal is separated off and passed through an intermediate frequency amplifier 25 and since the audio portion of the normal television signal is frequency modulated, through a discriminator 27 which functions as the audio detector. Upon further amplification the audio signal is applied to an output device such as a loud speaker. The video portion of the detected signal passes through a video amplifier 29 for ultimate display on the picture tube 31. The detected video signal also contains synchronizing information which may be separated from the video signal after amplification by a synchronizing signal separating circuit 33 which serves to not only separate the synchronizing information from the video information but also to separate the vertical synchronizing signals from the horizontal synchronizing signal. These respective synchronizing signals are then supplied to vertical and horizontal sweep generators or oscillators 35 and 36 to control after amplification the sweeping or scanning of the beam within the picture tube 31.

The television receiver as thus far described is a typical and well-known variety, and virtually any other television receiver circuitry could be substituted therefor within the spirit and scope of the present invention. More sophisticated present day television receivers often employ so-called remote control units such as 39 which function to allow the television viewer to change channels or otherwise adjust his receiver without leaving the comfort of his chair. Such remote control devices often initiate a search tuning operation within the television receiver in which the receiver begins tuning through the band until it encounters the first active channel at which time the search tuning operation stops. If the viewer is not satisfied with the programming found by this search tuning operation he merely reinitiates search tuning by actuating his remote control unit, and the receiver will begin from that point and search out the next active channel. Such remote control systems may also employ an automatic shutoff feature which will disable the receiver when a station being received goes off the air. Such an automatic shutoff feature, for example, will turn the receiver off about one minute after that station goes off the air. Such remote control search tuning and automatic shutoff receivers are well-known in the art and are, for example, illustrated by applicant's aforementioned United States patents and copending application Ser. No. 833,930 assigned to the assignee of the present invention. As more clearly pointed out in applicant's aforementioned United States patents the search tuning system may comprise one or more motors for driving UHF amd VHF tuners, which motors have a latching feature in their control circuit 40 to hold them in their drive condition once actuated by the remote control signal 39 until that latching is interrupted by a signal indicating that the receiver has been tuned to a new active channel. The circuitry for providing this search tune detection is illustrated by block 41 of FIG. 1 and forms the essence of the present invention.

Figure 2:
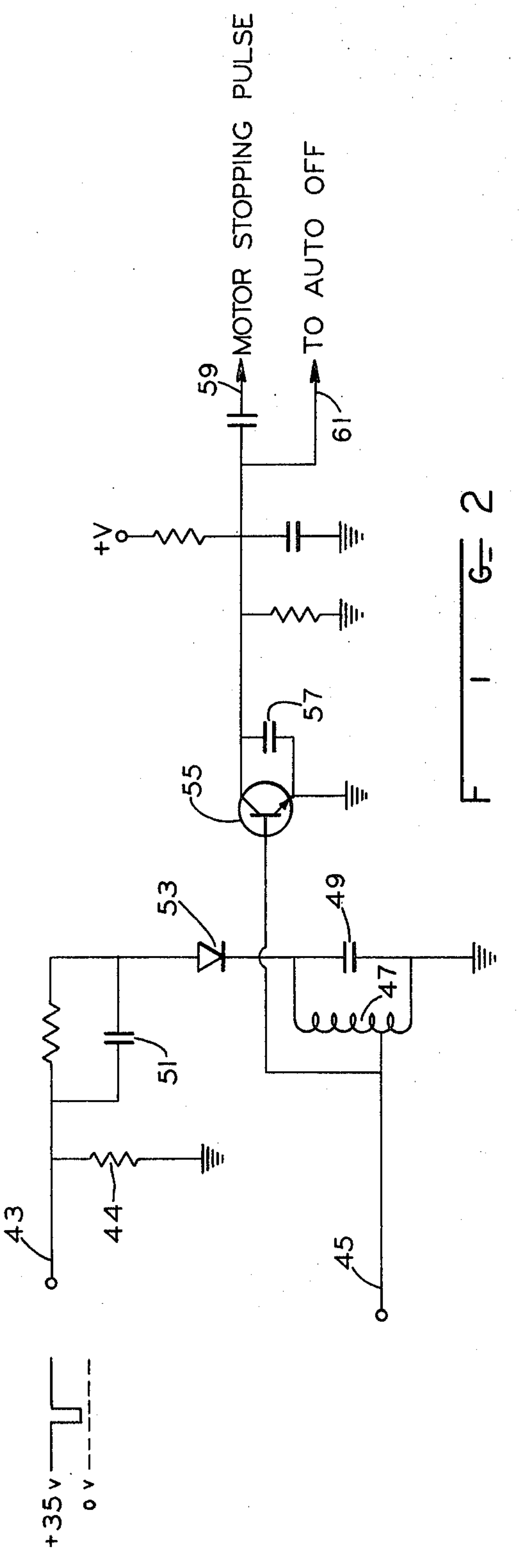
FIG. 2 is a schematic diagram of a simplified form of the search tuning detector of the present invention.

Considering now FIG. 2 which illustrates a simplified form of the search tune detector 41 of FIG. 1, the circuit is seen to have as its inputs synchronizing signals on line 43 (resistor 44 is actually a part of the sync pulse source) and a video intermediate frequency carrier signal on line 45 assuming, of course, that the receiver is tuned to an active station. Throughout the discussion the input and output lines will bear similar reference numerals in FIG. 1 to allow ready reference to their source or destination.

The search tune detector comprises tuned circuit means in the form of the parallel combination of the coil 47 and the capacitor 49. This parallel combination forms a high Q tank circuit tuned to resonate at, for example, 45.75 megahertz, the currently used video intermediate frequency carrier frequency. This tank circuit has an additional reactive means in the form of capacitor 51 coupled thereto when the diode 53 is biased to conduct. The tap on the tank circuit inductor connects to the base of an NPN transistor 55 to cause it to conduct on peaks of positive half cycles. Transistor 55 could, of course, be replaced by another current control device such as PNP type transistor, in which case it would conduct on the negative half cycle peaks of oscillation of the tank circuit. A capacitor 57 shunting the collector and emitter of the transistor 55 functions to hold the collector at conduction voltage level between the peaks at which conduction occurs.

In a particular television receiver in which the present invention has been employed, the synchronizing signal line was normally at a positive DC level with the synchronizing pulses being negative going. Since the capacitor 51 charges to the positive DC level between the occurrence of synchronizing pulses, the occurrence of such a pulse discharges the capacitor 51 driving the anode of diode 53 negative for the duration of that pulse. Under these conditions the diode 53 is normally biased in a forward direction thus effectively adding the capacitor 51 to the tuned circuit so that its resonant frequency is well below the receiver intermediate frequency and is, in fact, outside the video intermediate frequency pass band. Under these circumstances the tank circuit will not resonate, and the base of the transistor 55 is effectively grounded so that the transistor 55 is nonconductive. Upon the occurrence of a synchronizing pulse the diode 53 is biased to its nonconducting state, and the tank circuit may resonate if a signal of the appropriate frequency is present on line 45. If when this synchronizing pulse occurs there is a signal of the appropriate intermediate frequency on line 45, the tank circuit will resonate raising the potential at the base of transistor 55 above ground level on the positive peaks of the resonant signal thus causing transistor 55 to conduct and providing a negative going step signal on line 61. The negative sync pulses open the diode 53 permitting the tank circuit to resonate and thus allowing the transistor 55 to conduct. Capacitor 57 holds the collector of transistor 55 at saturation potential between sync pulses thus providing a negative going step of voltage initiated when the transistor 55 first goes to conduction. In the particular system in which this search tune detector was employed a pulse rather than a level change was used to stop the tuner drive motor, and accordingly a capacitor is illustrated in the line 59 leading to the tuner drive motor latching circuit, and the pulse appearing on this line causes that latch to open thereby stopping the tuner drive motor.

As noted earlier, search tuning television receivers may also employ an automatic shutoff feature, for example, of the type disclosed in applicant's copending application Ser. No. 66,093, and the voltage level on line 61 due to saturation of the transistor 55 may be employed to inactivate that automatic shutoff feature while a television signal is being received.

When tuning a continuous type tuner such as found on most UHF tuners down through an active channel a 45.75 megahertz intermediate frequency signal is produced when the difference between the sound carrier and the local oscillator signal is 45.75 megahertz. As explained more fully in applicant's U.S. Pat. No. 3,388,215, when this occurs there is no synchronizing signal present on line 43, and the tank circuit will not resonate, and thus a false output signal indicative of proper tuning of the receiver should not result. In testing a circuit built in accordance with FIG. 2 the receiver did on occasion stop on this sound intermediate frequency carrier signal, and the step function output was weak thus leading applicant to develop the preferred embodiment illustrated in FIG. 3.

To understand why the circuit of FIG. 2 may erroneously indicate proper tuning when the intermediate frequency on line 45 is the sound intermediate frequency carrier, reference should be made back to FIG. 1. When the sound carrier is present on line 45 there is no video signal and synchronizing signals present in the output of the video amplifier 29, and thus the automatic gain control 63 has the early stages of the receiver set to maximum gain. Under this condition there may be noise from the synchronization pulse generating circuitry sufficient to bias the diode 53 to its nonconducting state thus permitting the tank circuit to resonate. To prevent this possibility a sync comparator circuit was employed in the preferred embodiment of FIG. 3, and to improve the output level a Darlington pair was used to replace the transistor 55.

Figure 3:
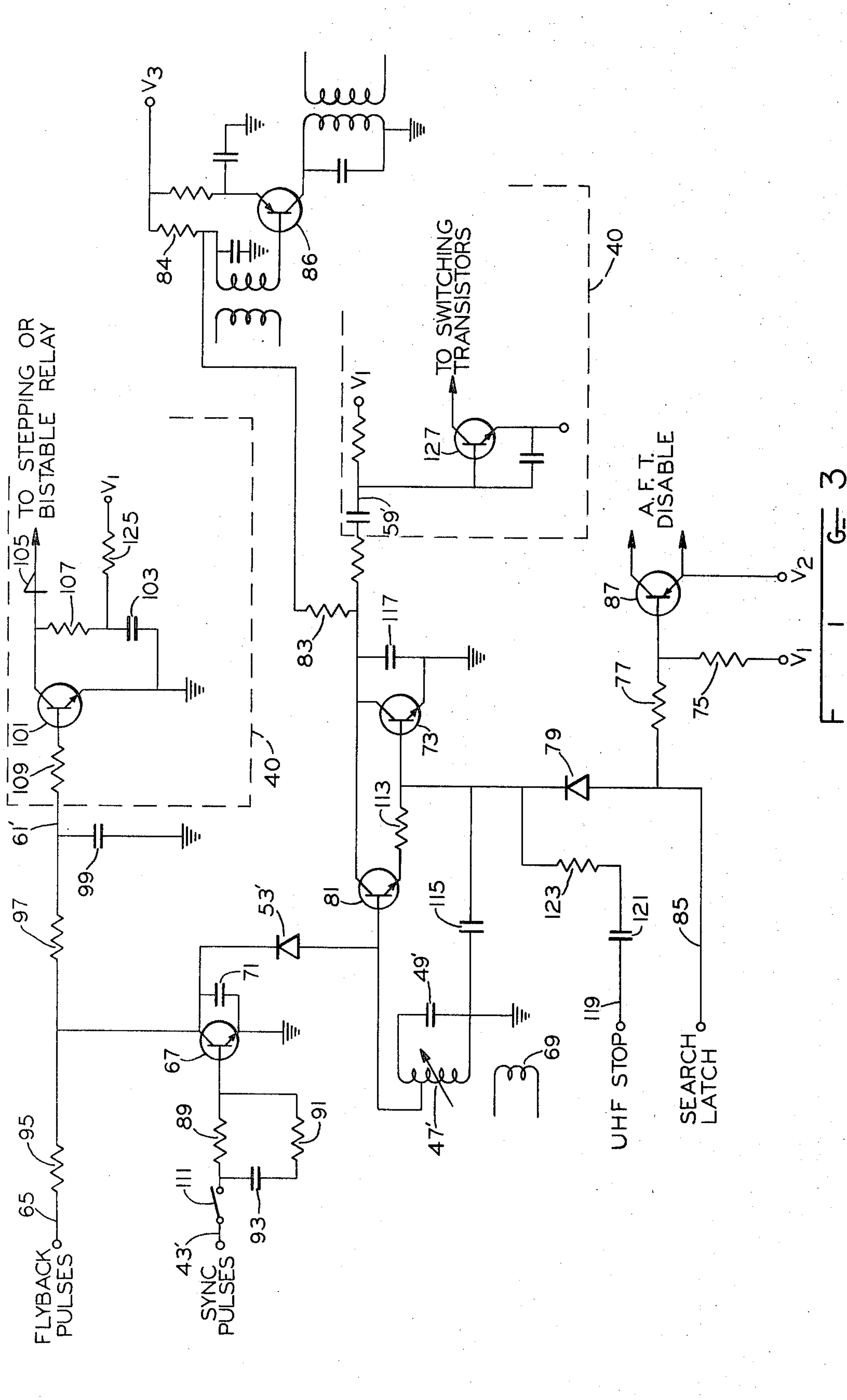
FIG. 3 is a more complete schematic diagram of a preferred embodiment of the search tuning detector of the present invention.

Turning now to the more sophisticated search tune detector of FIG. 3, the synchronization signal input and the automatic shutoff and motor stopping outputs are indicated by corresponding primed reference numerals. The circuit of FIG. 3 has an additional input in the form of flyback pulses on line 65. The flyback pulses are substantial positive going pulses on an otherwise zero potential background. In the particular embodiment shown, the sync signal source, 43′, is at a positive potential in the order of 35 volts. When no sync pulses are present on the line 43′, the current flowing through resistor 89 into the base of transistor 67 saturates transistor 67, and thus it clamps the cathode of diode 53′ to ground. In this condition, diode 53′ loads the tuned circuit 47′–49′ sufficiently to prevent it from resonating at any frequency within the intermediate frequency pass band of the receiver. Diode 53′ will be rendered inactive (by its cathode going positive with respect to its anode) only upon the concurrence of a positive flyback pulse and a negative going sync pulse. If only a flyback pulse is present the transistor 67 will still be saturated, and the cathode of diode 53′ clamped to ground. If only a sync pulse were present the transistor 67 might be driven to its nonconductive state, however, the series combination of diode 53′ and capacitor 71 would still load and detune the resonant circuit. Also, the flyback waveform would be in its negative excursion, thus preventing a 45.75 megahertz signal from charging capacitor 71 which would remove the loading from the resonant circuit.

A source of intermediate frequency signals in the receiver is easily obtained by mounting the inductor 47′ in sufficiently close proximity to an intermediate frequency coil 69 of the receiver intermediate frequency system that mutual inductance between these two coils causes the signal present in the intermediate frequency coil to be induced in the coil 47′. This coil 47′ may, for example, be provided with an adjustable core to change its inductance and thus allow tuning of the system at the time of manufacture or in servicing. This coil 47′ along with capacitor 49′ forms a tank circuit tuned to resonate at the picture intermediate frequency carrier frequency of 45.75 megahertz when the diode 53′ has its cathode positive with respect to ground and when transistor 73 is in its nonconducting state. When a television signal is being received this transistor 73 is saturated by current flowing from the voltage source $V_1$ through resistors 75 and 77 and diode 79 into the base of transistor 73. With the transistor 73 continuously saturated when not searching the collector-base diode of transistor 81 heavily loads the tank circuit preventing it from resonating, as does diode 53′ and transistor 67, except during sync pulses. Therefore, this tank circuit which is mutually coupled to, for example, a third intermediate frequency coil of the video intermediate frequency amplifier of the receiver normally has no deleterious effect on the band pass characteristics of the video intermediate frequency amplifier. Thus one function of the transistor 73 is to keep the tank circuit detuned or heavily loaded when the receiver is not searching for a station. Strictly speaking, the circuit of FIG. 2 is effective to detune the resonant circuit primarily due to the adding of additional reactance in the form of capacitor 51 when diode 53 is conducting, whereas the tuned circuit of FIG. 3 is heavily loaded when either the diode 53′ is conducting or the collector-base diode of transistor 81 is biased so as to load the tuned circuit. In other words, the circuit of FIG. 2 functions primarily to shift the frequency at which the resonant circuit resonates, whereas the circuit of FIG. 3 is primarily effective to change the Q of the resonant circuit, however, throughout the present specification the terms "detuned" and "loaded" are used pretty much interchangeably since, for the purposes of the present invention, either changing the resonant frequency or diminishing the Q of the resonant circuit serves the requirements of the present invention.

The resistor 83 which forms the collector load resistor of transistor 73 may also form part of the base bias network of PNP sound intermediate frequency amplifier transistor 86, and hence when transistor 73 is nonconducting this base bias circuit is open cutting off the sound intermediate frequency amplifier transistor 86 and muting the receiver audio output during a search operation. Resistors 83 and 84 form a base bias voltage divider for the sound intermediate frequency amplifier transistor 86. Thus the transistor 73 has as a second function sound muting during a search operation. For the case in which it is not desired to employ transistor 73 for sound muting, resistor 83 will return to a positive voltage source in the order of 15 to 20 volts.

The search tuning block 40 of FIG. 1 contains three motor control circuits, VHF, UHF up, and UHF down, and each of these will contain latching circuits to energize the corresponding motor windings. There will also be corresponding transistors and diodes associated with each such motor control circuit which, when a motor control circuit is latched during a tuning operation, will cause an increase in the current flowing through resistors 75 and 77 to the search latch circuit by way of line 85 going negative with respect to ground. This will lower the voltage at the base of transistor 87 and also lower the potential at the anode of diode 79 causing that diode to open. If no intermediate frequency carrier signal is present transistor 73 will also open therefore opening the previously-mentioned base bias circuit of the sound intermediate frequency amplifier transistor thereby muting the sound.

Returning to the transistor 67, its base connects through the network comprised of resistors 89 and 91 and capacitor 93 to a source of synchronizing pulses on line 43′. As noted earlier, this source is normally at a positive DC level such as, for example, 35 volts, and the synchronizing pulses are negative going with an amplitude in the order of 20 volts. When no sync signal is present the direct current base current through resistor 89 keeps transistor 67 saturated. When a sync pulse occurs the base of transistor 67 is driven negative by way of capacitor 93 and resistor 91 thus opening transistor 67 for the duration of the pulses. Between synchronizing pulse capacitor 93 charges to the potential existing between the base of transistor 67 and the direct current voltage level of the synchronizing pulse source. During the presence of the synchronizing pulse the high and low potential sides of capacitor 93 drop with the negative synchronizing pulse while the voltage on the base of transistor 67 drops by the voltage divider across the capacitor placing the base of transistor 67 below ground potential but above the emitter-base diode Zener voltage of transistor 67. Capacitor 93 begins to discharge, but before the base voltage reaches that required for base conduction the trailing edge of the synchronizing pulse drives the base in a positive direction so as to again saturate transistor 67. The collector of transistor 67 connects to the junction between resistors 95 and 97, which resistors comprise a voltage divider for the positive going flyback pulse on lines 65. As noted earlier, these flyback pulses are from zero reference potential positive going to approximately 260 volts. This voltage divider circuit is grounded through capacitor 99 in so far as time varying signals are concerned, and any direct current component may flow to ground through the base-emitter circuit of transistor 101. This last mentioned transistor forms a part of the automatic turn-off circuitry of block 40 of FIG. 1. So long as transistor 67 remains in its saturated state indicating that no television signal is being received there will be no base current flow through transistor 101, and thus that transistor will remain open. With transistor 101 in its nonconducting state the capacitor 103 will charge from the positive voltage source V1 through resistor 125, and when the firing voltage of the four-layer diode 105 is reached the resistance of that thyristor becomes extremely low allowing the capacitor 103 to discharge through a current limiting resistor 107, which discharge causes a stepping relay in the search and automatic off block 40 of FIG. 1 to advance one position. If the position advanced to is not the off position capacitor 103 will again charge until the four-layer diode breakdown voltage is reached thus advancing this stepping relay again, and the process will continue until the off position is reached. Or, the discharge current through the four-layer diode may actuate a bi-stable on-off relay, opening the power supply to the television receiver.

When a television signal is being received the sync pulse and flyback pulse concur, and during the sync pulse when transistor 67 is nonconducting its collector may go positive as permitted by the voltage divider 95–97. During the negative excursion of the flyback pulse waveform diode 53′ conducts preventing this negative excursion from cancelling the positive current flow to automatic shutoff transistor 101 which was developed by the positive pulse. In other words, diode 53′ acts as a shunt rectifier, and if it were not present the collector-base diode of transistor 67 would conduct during the negative excursion of the flyback pulse waveform drawing current from the base circuit through resistor 89. The ratio of resistors 95 and 89 and the ratios of the voltage levels are such that the base would not go below chassis potential. Thus the collector-base diode of transistor 67 would act as a shunt rectifier. When the sync and flyback pulses concur a net positive current flows through resistor 109 into the base of shutoff transistor 101 causing it to conduct. When this transistor is conducting capacitor 103 cannot charge, and the automatic shutoff circuit is deactivated when a television signal is being received. The only function of resistor 109 is to limit base current (due to any transient which might be induced in line 61′) in transistor 101 since, due to the particular component positioning in a specific receiver in which the present invention is employed, its absence might otherwise allow a high voltage arc in the picture tube to induce an excessive base current to this transistor. The automatic shutoff circuit may also be deactivated, for example, while making service adjustments on the receiver when no television signal is being received by opening the switch 111 which thus opens the base of transistor 67 making that transistor nonconductive. With the switch 111 open diode 53′ acts as a shunt rectifier to the flyback pulse waveform resulting in a positive current flow through resistor 97 into the base of shutoff transistor 101 thus deactivating the automatic shutoff circuit.

As noted earlier, when transistor 73 is saturated the collector-base diode of transistor 81 heavily loads the resonant circuit so that it does not effect the video band pass characteristics of the receiver. Also, when any one of the three motor control circuits in the search tuner are latched transistor 73 is nonconducting unless the tuning motor has not yet driven the tuner off of an active station. With no television signal being received there is no synchronizing signal on line 43′, and the transistor 67 is continuously saturated, and diode 53′ maintains the tank circuit in its detuned condition. If the UHF tuning motor is tuning the UHF tuner down in frequency approaching a television signal the local oscillator 17 will approach a frequency at which the difference between it and the second radio frequency carrier is 45.75 megahertz. When this occurs there is no synchronizing signal present on line 43′, and the transistor 67 continues to be saturated, and the tank circuit continues to be detuned. As the local oscillator frequency decreases further, but before its difference with the picture radio frequency carrier is 45.75 megahertz, sync pulses will appear on line 43′, but the flyback pulses on line 65 may not yet be synchronized with them. If these two pulses are not synchronized the sync pulses will open transistor 67 during their presence, but this will occur during the negative excursion of the flyback pulse waveform so that diode 53′ will remain conducting and the tank circuit remain detuned. If the signals are in synchronism the sync pulses will open transistor 67 gating a portion of the positive flyback pulse to open the diode 53′ so that the tank circuit is capable of resonating at the exemplary 45.75 megahertz intermediate frequency. At this time there is still no picture intermediate frequency carrier at this frequency in the intermediate frequency coil 69 to cause the tank circuit to resonate. As the frequency of the local oscillator continues to decrease the picture intermediate frequency carrier approaches the resonate frequency of the tank circuit, and the flyback pulses become coincident with the synchronizing pulses thus permitting the tank circuit to resonate only for the duration of the synchronizing pulse when the picture intermediate frequency carrier is at 45.75 megahertz. When this condition occurs the resonating voltage in the tank circuit will cause a base current in transistor 81 on the positive peaks of this voltage. This in turn will cause a much larger emitter current from transistor 81 to flow through resistor 113 into the base of transistor 73. Capacitor 115 which couples the base of transistor 73 to ground acts as a radio frequency filter so that only pulses of direct current at the synchronizing pulse rate flow into the base of transistor 73. Each such pulse causes transistor 73 to almost saturate for its duration. The saturation is not quite complete since complete saturation would result in no collector voltage for transistor 81 and hence no emitter current to supply the base of transistor 73. Also, the collector-base diode of transistor 81 would load the tank circuit so that it could no longer resonate. Transistors 81 and 73 are connected together in a Darlington type configuration, and their common collectors, in a typical example, drop to about 0.6 to 0.8 of a volt above the chassis potential. The capacitor 117 holds the collectors at this voltage level between pulses and also acts as a radio frequency filter for the collector of transistor 81. Strictly speaking, transistors 81 and 73 form a true Darlington pair only during the searching operation since during periods of nonsearching the second transistor 73 is saturated causing the base-collector diode of the first transistor 81 to heavily load the tuned circuit.

When transistor 73 conducts a negative going step is produced on its collector restoring the base bias for the sound intermediate frequency amplifier transistor to unmute the audio output. This negative step is passed through a capacitor in line 59' to the base of a transistor in the motor control and automatic shutoff block 40 of FIG. 1 rendering that transistor (127 in FIG. 3) momentarily nonconductive and interrupting the current flow to latching circuitry in the search tuning system thus releasing the tuning motor. The transistor 127 functions as a gate for momentarily opening an emitter bus to three transistor emitters, the transistors respectively functioning as switches for UHF up, UHF down and VHF motor control. In other words, a third function of transistor 73 is to unlatch a latching circuit controlling a tuning motor.

Typically, search tuning systems sequentially move a VHF tuner through its several detented positions, and one of those positions is a UHF tuning position. In the UHF position a pair of switch contacts on the VHF detent type tuner supply a positive voltage for the UHF tuner, and the presence of this positive voltage is sensed for on line 119. When the step of positive voltage occurs upon movement of the VHF tuner into the UHF position, capacitor 121 starts to charge with the charging current flowing through resistor 123 and the base of transistor 73, causing that transistor to momentarily conduct thus stopping the search operation. The duration of the charging current is a function of the time constant of capacitor 121 and resistor 123 while its initial value is an inverse function of resistor 123. In other words, the transistor 73 has as a fourth function the stopping of the VHF tuner in its UHF position.

In summary, a tank circuit tuned to resonate at the system intermediate frequency has a tap on its inductor which connects to the base of a first transistor in a Darlington pair and also to the anode of a diode whose cathode connects to the collector of a third transistor which is saturated except for the duration of synchronizing pulses. This diode heavily loads the tank circuit preventing if from resonating. The collector supply for this third transistor is the positive flyback pulse which is coincident with the synchronizing pulse. Thus, in the collector circuit of this third transistor, that portion of the positive flyback pulse coincident with the sync pulse is gated on opening the diode for the duration of the sync pulse during which time the tank circuit may resonate. The emitter of the first transistor connects to the base of the second transistor in the Darlington pair, and the collectors of the first and second transistors are connected together. When the system intermediate frequency is coupled to the tank circuit it can resonate only during the synchronizing pulses. Positive radio frequency pulses on the base of the first transistor cause a large negative step of voltage on the common collectors, which step, or a pulse derived therefrom, causes the tuning motors to stop by releasing the motor control latch circuits and also causes the second transistor of the Darlington pair to be saturated. Through the collector-base diode of the first transistor the tank circuit is continuously loaded so that it cannot resonate even during synchronizing pulses to detrimentally effect the video intermediate frequency band pass characteristics of the system.

From the foregoing it should be clear that the present invention provides a number of improvements over the prior art systems recited earlier. The search tune detector of the present invention is relatively insensitive to noise and spurious signals. Due to the absence of time constants such as were involved in the aforementioned prior art, the present invention exhibits good stopping performance. The search tune detector of the present invention is insensitive to variations in sync pulse width, flyback pulse amplitude and horizontal hold control settings. The tuned circuit does not adversely effect the video intermediate frequency band pass characteristics, and the stopping signal is independent of the video content of the received signal. The present invention can be implemented at a lower cost than than the aforementioned systems.

Thus, while the present invention has been described with respect to a specific embodiment, numerous modifications will suggest themselves to those of ordinary skill in the art. For example, the tank circuit may be either capacitively or inductively coupled to a portion of the video intermediate frequency amplifier. By using a negative voltage source positive motor stopping pulses may be obtained by using PNP transistors in the Darlington pair, or the tank circuit may be referenced to a positive voltage and PNP transistors used to produce a positive motor stopping pulse in which case the flyback pulse would also be referenced to the positive voltage. These and other modifications will readily suggest themselves to those of ordinary skill in the art, and accordingly the scope of the present invention is to be measured only by that of the appended claims.

What is claimed is:

1. In a search tune heterodyne television receiver, a circuit for detecting the tuning of the receiver to an active station and for providing an output signal indicative of the receiver being tuned to an active station comprising:

tuned circuit means resonant at an intermediate frequency of the receiver and coupled to a point in the receiver where an intermediate frequency appears when the receiver is properly tuned to an active station;

search tuning means for causing a receiver tuner to search-tune for an active station;

reactive means;

means for selectively connecting said reactive means to said tuned circuit means to thereby selectively change the resonant frequency of the said tuned circuit means at all receiver operation periods other than at least a portion of the active search period of said search tuning means; and means responsive to resonance of said tuned circuit means for providing an output signal for disabling receiver search tuning of said search tuning means when the receiver is tuned to an active station.

2. The apparatus of claim 1 wherein said selectively connecting means comprises;

means for sensing the synchronizing pulses and the presence of intermediate frequency signals and for changing the resonant frequency of said tuned circuit means on coincidence of said synchronizing pulses and presence of intermediate frequency to cause said tuned circuit means to be resonance at said coincidence and to be out of resonance at all other times.

3. The apparatus of claim 2 with diode means connecting said tuned circuit means and said reactive means;

transistor means connecting said tuned circuit means and said search tune means to deactivate said search tuning means upon resonance of said tuned circuit means;

said selective connecting means being connected to said diode means to cause said diode means to open upon the presence of synchronizing pulses to thereby disconnect said reactive means from said tuned circuit means during synchronizing pulses to cause said tuned circuit means to resonate and operate said transistor means to deactivate said search tuning means.

4. In a search tune heterodyne television receiver, a circuit for detecting the tuning of the receiver to an active station and for providing an output signal indicative of the receiver being tuned to an active station comprising:

tuned circuit means resonant at an intermediate frequency of the receiver and coupled to a point in the receiver where an intermediate frequency appears when the receiver is properly tuned to an active station;

search tuning means for causing a receiver tuner to search-tune for an active station;

damping means;

means for selectively connecting said damping means to said tuned circuit means to thereby selectively damp the resonant oscillations of the said tuned circuit means at all receiver operation periods other than at least a portion of the active search period of said search tuning means; and means responsive to resonance of said tuned circuit means for providing output signal for disabling receiver search tuning of said search tuning means when the receiver is tuned to an active station.

5. The apparatus of claim 4 with said damping means comprising switchable conductive means connected to said tuned circuit means, control means for switching said conductive means to a non-conductive state upon presence of a search condition of said search tuning means, second control means for switching said conductive means to a conductive state upon tuning of said television receiver to an active station to thereby load said tune circuit means and damp the oscillations in said tuned circuit means.

6. The apparatus of claim 5 with said selective connection means comprising means for detecting coincidence of the receiver flyback pulses, synchronization pulses, and presence of intermediate frequency carrier oscillations, to switch said conductive means to a non-conductive state thereby unloading said tuned circuit means to cause operative resonance of said tuned circuit means to deactivate said search tuning means.

7. The apparatus of claim 6 with said conductive means being switched to a conductive state upon operative resonance of said tuned circuit means to stop said search tuning means and at the same time load said tuned circuit means to damp resonant oscillations to a substantially lower amplitude.

* * * * *